(12) United States Patent
Oliver

(10) Patent No.: US 8,196,289 B2
(45) Date of Patent: Jun. 12, 2012

(54) METHOD FOR STAKING PART ASSEMBLY FASTENERS

(75) Inventor: Richard T. Oliver, Westfield, IN (US)

(73) Assignee: Porter Group, LLC, Novi, MI (US)

( * ) Notice: Subject to any disclaimer, the term of this patent is extended or adjusted under 35 U.S.C. 154(b) by 0 days.

(21) Appl. No.: 12/958,505

(22) Filed: Dec. 2, 2010

(65) Prior Publication Data
US 2011/0067223 A1  Mar. 24, 2011

Related U.S. Application Data

(62) Division of application No. 11/560,376, filed on Nov. 16, 2006, now Pat. No. 7,895,738.

(51) Int. Cl.
*B23P 19/00* (2006.01)

(52) U.S. Cl. ............. 29/759; 29/760; 29/761; 29/243.5; 29/33 P; 29/823; 72/404; 72/405.06; 198/346.2

(58) Field of Classification Search ............. 29/796, 29/799, 715, 823, 33 P; 198/341.01, 346.2, 198/775, 47.1; 72/405.06, 404
See application file for complete search history.

(56) References Cited

U.S. PATENT DOCUMENTS

| | | |
|---|---|---|
| 3,067,496 A | 12/1962 | Rayburn |
| 3,557,425 A | 1/1971 | Scharf |
| 3,704,502 A | 12/1972 | Meyers |
| 4,246,815 A | 1/1981 | Hugo |
| 4,501,179 A | 2/1985 | Iwata |
| 4,583,634 A | 4/1986 | Kraus et al. |
| 4,767,298 A | 8/1988 | Bocchicchio et al. |
| 4,783,889 A | 11/1988 | Hayashi |
| 4,805,299 A * | 2/1989 | Sekimoto et al. ............... 29/796 |
| 4,914,996 A | 4/1990 | Lavorel |
| 4,967,471 A | 11/1990 | Noguchi et al. |
| 5,105,857 A | 4/1992 | Ellis |
| 5,244,073 A | 9/1993 | Mori et al. |
| 5,335,702 A | 8/1994 | Goto |
| 5,479,853 A | 1/1996 | Carroll et al. |
| 5,570,494 A | 11/1996 | Prince, Jr. |
| 5,970,754 A | 10/1999 | Polato |
| 6,662,067 B1 | 12/2003 | Xu et al. |
| 6,754,949 B2 * | 6/2004 | Ishii ................................. 29/739 |
| 2002/0029670 A1 | 3/2002 | Long et al. |
| 2003/0121758 A1 | 7/2003 | Spejna et al. |
| 2008/0115340 A1 | 5/2008 | Oliver |

* cited by examiner

*Primary Examiner* — Minh Trinh
(74) *Attorney, Agent, or Firm* — Brooks Kushman P.C.

(57) ABSTRACT

Staking apparatus (22) disclosed performs a method for staking one or more fasteners (44) of a part assembly (18) are provided by a conveyor (14), a lower lift and lock assembly (24) including a lower lifter (28) and a lower lock (30), and an upper press (26). Lower and upper staking punches (40, 60) of the lower lifter (28) and the upper press (26), respectively, provide the staking while at least one and preferably a plurality of springs (36) resiliently support a pallet assembly (16) on which the part assembly (18) is positioned.

5 Claims, 4 Drawing Sheets

METHOD FOR STAKING PART ASSEMBLY FASTENERS

CROSS-REFERENCE TO RELATED APPLICATIONS

This application is a divisional of U.S. application Ser. No. 11/560,376 filed on Nov. 16, 2006 by Richard T. Oliver under the title APPARATUS AND METHOD FOR STAKING PART ASSEMBLY FASTENERS, now U.S. Pat. No. 7,895,738 which issued Mar. 3, 2011, the entire disclosure of which is hereby incorporated by reference.

BACKGROUND OF THE INVENTION

1. Field of the Invention

This invention relates to a method for staking fasteners of a part assembly so as to secure components of the part assembly to each other.

2. Background Art

Certain part assemblies such as vehicle seat latches have components that include spaced plates as well as latching members positioned between the plates and often on the outer side of one or both plates. The plates and such other latching members are normally secured to each other by staking which forms at least one head on each fastener so as to provide securement thereof to the associated component or components.

Assembly lines for part assemblies conventionally have a direction of conveyance along which a conveyor conveys pallets that support the part assemblies for staking operations at a plurality of staking stations. Usually the pallets are moved transversely from the conveyor for the staking operation which requires lateral movement instead of staking at a location along the direction of conveyance. Such lateral movement is first from the conveyor and then after the staking back to the conveyor such that the time involved in the staking includes the time of such lateral movement.

Patents and applications noted during an investigation conducted in connection with the present invention include: U.S. Pat. No. 4,501,179 Iwata; U.S. Pat. No. 4,583,634 Kraus et al.; U.S. Pat. No. 4,783,889 Hayashi; U.S. Pat. No. 5,244,073 Mori et al.; U.S. Pat. No. 5,479,853 Carroll et al.; U.S. Pat. No. 5,570,494 Prince, Jr.; and U.S. Pat. No. 6,662,067 Xu et al.; and U.S. Patent Application Publication US 2003/0121758.

SUMMARY OF THE INVENTION

An object of the invention is to provide an improved method for staking a fastener of a part assembly.

In carrying out the above object, the method for staking a fastener of a part assembly in accordance with the invention is performed by conveying the part assembly and the fastener thereof on a pallet along a direction of conveyance to a staking station. The pallet and the part assembly thereon as well as the fastener of the part assembly are then resiliently lifted upwardly from the conveyor to a location between lower and upper staking punches. Relative movement of the lower and upper staking punches toward each other stakes the fastener of the part assembly, and the pallet and the staked part assembly thereon is then lowered downwardly onto the conveyor for conveyance from the staking station.

The pallet is disclosed as being lifted from the conveyor by upwardly moved springs. The lower staking punch has a resilient bushing that contacts the part assembly from below during the staking, and the upper staking punch has a resilient bushing that contacts the upper part assembly from above during the staking The lower staking punch as disclosed is supported by a lower lifter for the staking and the upper staking punch is moved downwardly to provide the relative movement of the lower and upper staking punches toward each other to stake the fastener of the part assembly. More specifically, the lower staking punch is supported by a lower lifter that also includes springs for resiliently lifting the pallet upwardly from the conveyor upon upward movement of the lower lifter. Furthermore, a lower lock moves at least one lock member from an unlocked position adjacent the lower lifter to a locked position below the lower lifter to support the lower lifter during the staking provided by the downward movement of the upper staking punch. More specifically, the lower lock as disclosed includes a pair of lock members that are moved in opposite directions to each other from an unlocked position on opposite sides of the lower lifter to a locked position below the lower lifter to support the lower lifter during the staking provided by the downward movement of the upper staking punch. Also the pair of lock members as disclosed are moved along the direction of conveyance between the locked and unlocked positions.

In the preferred practice of the method as disclosed, the relative movement of a plurality of lower and upper punches toward each other respectively stake a plurality of fasteners of the part assembly.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
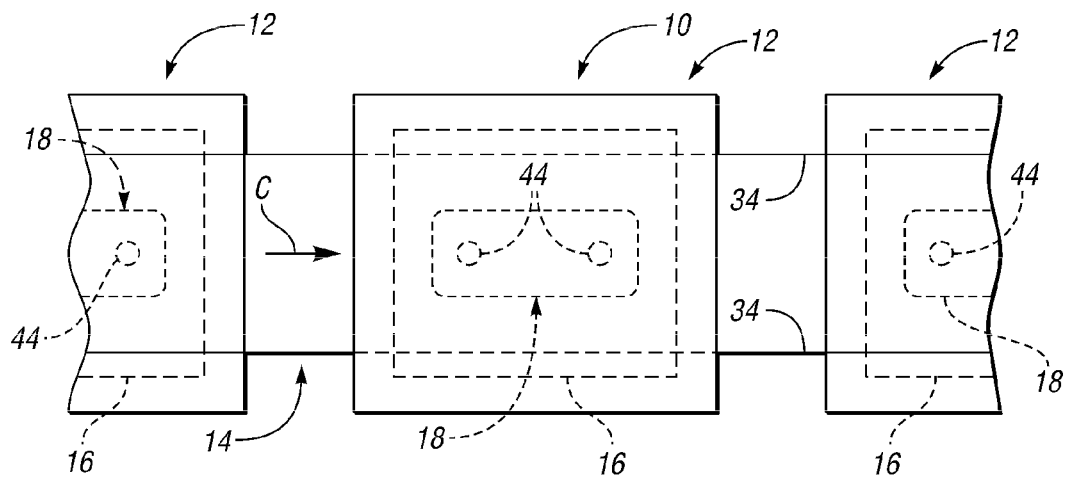
FIG. 1 is a top schematic view of a system having apparatus for staking fasteners of part assemblies in accordance with the method of the present invention.

With reference to FIG. 1, a part assembly staking system is generally indicated by 10 and includes staking stations 12 and a schematically indicated conveyor 14 that provides conveyance of part pallets 16 along a direction of conveyance C between the staking stations. Each part pallet 16 carries an associated part assembly 18 having at least one fastener to be staked as is hereinafter more fully described. The staking system 10 will conventionally also include buffer stations between the staking stations and the part assemblies may have many fasteners that are staked after passing through all of the staking stations 12.

Figure 2:
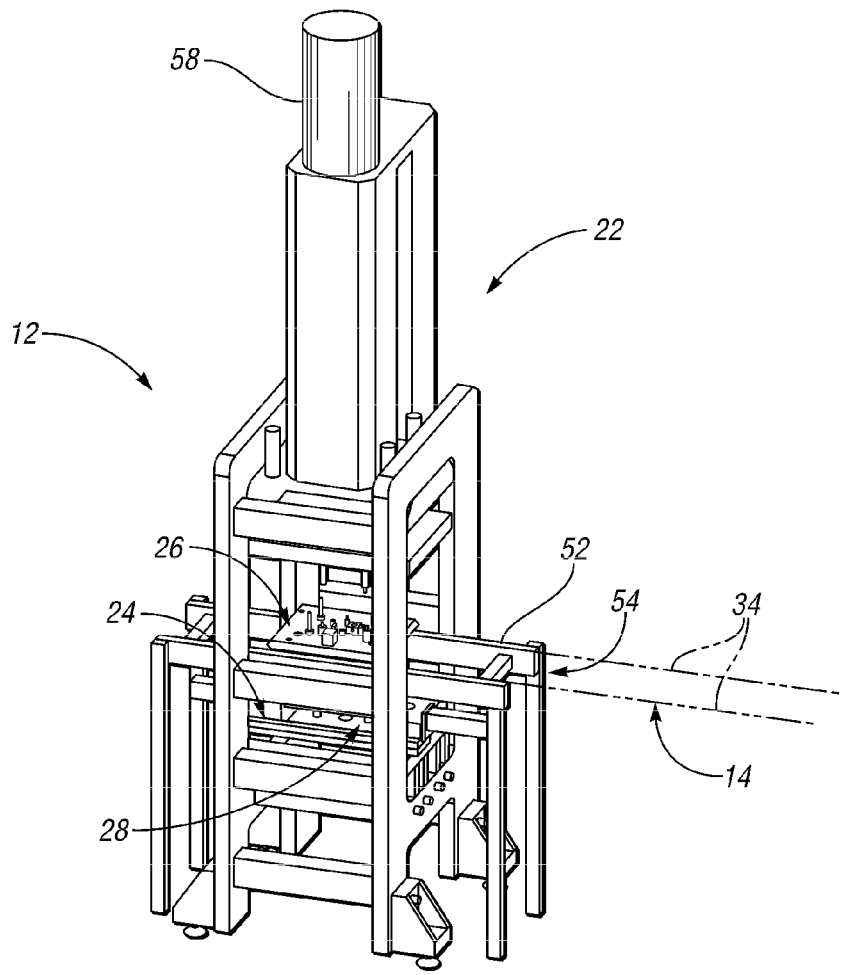
FIG. 2 is a perspective view of a staking station of the system for providing part assembly fastener staking.

With reference to FIG. 2, each staking station includes apparatus 22 constructed to perform the staking method of the invention.

Figure 3:
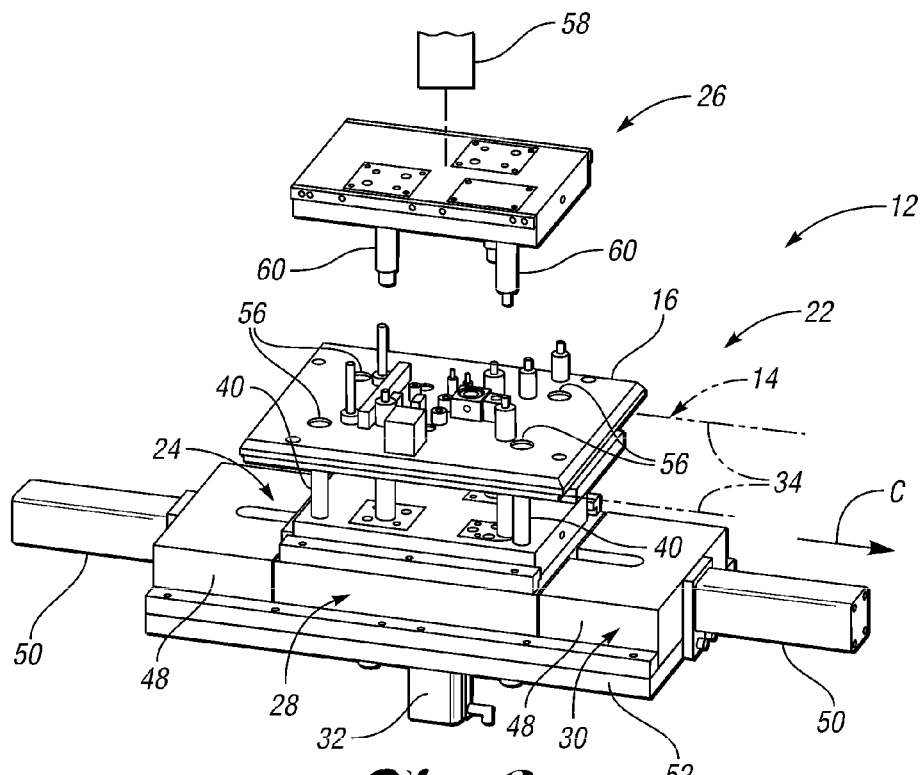
FIG. 3 is a partial exploded perspective view of the staking apparatus which includes a lower lift and lock assembly and an upper press which are shown with the lower lift and lock assembly in a lowered and unlocked position.
Figure 4:
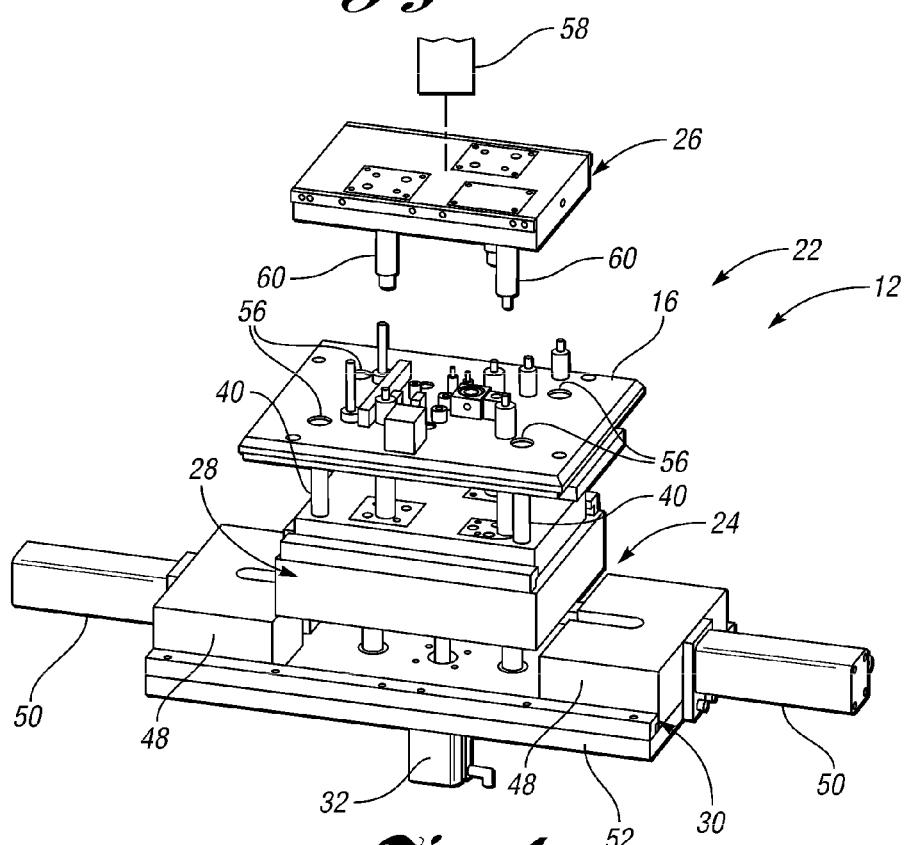
FIG. 4 is a perspective view similar to FIG. 3 but showing the lower lifter moved upwardly to a raised position.
Figure 5:
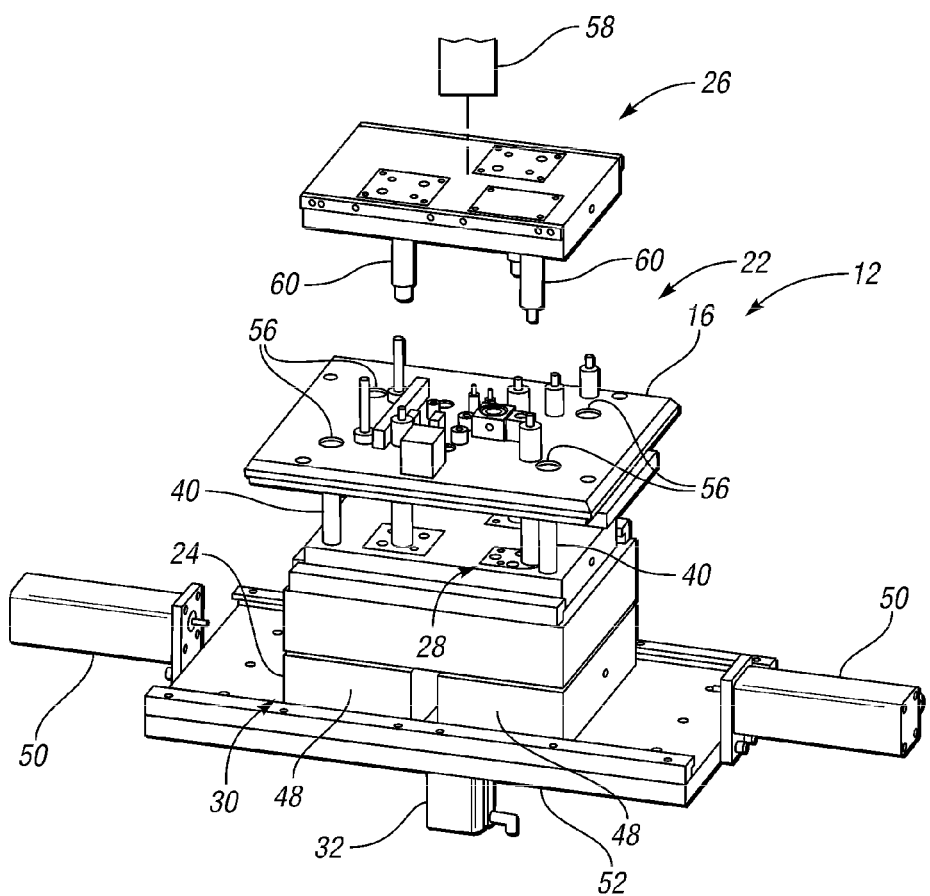
FIG. 5 is a view similar to FIG. 4 after a lock of the lower lift and lock assembly has been moved from an unlocked position to a locked position to support the lower lifter during the staking operation.

With continued reference to FIG. 2 and additional reference also to FIGS. 3-5, the staking apparatus 22 in addition to the conveyor 14 includes a lower lift and lock assembly 24 and an upper press 26.

The lower lift and lock assembly 24 as shown in FIGS. 3-5 includes a lower lifter 28 and a lower lock collectively indicated by 30.

Figure 7:
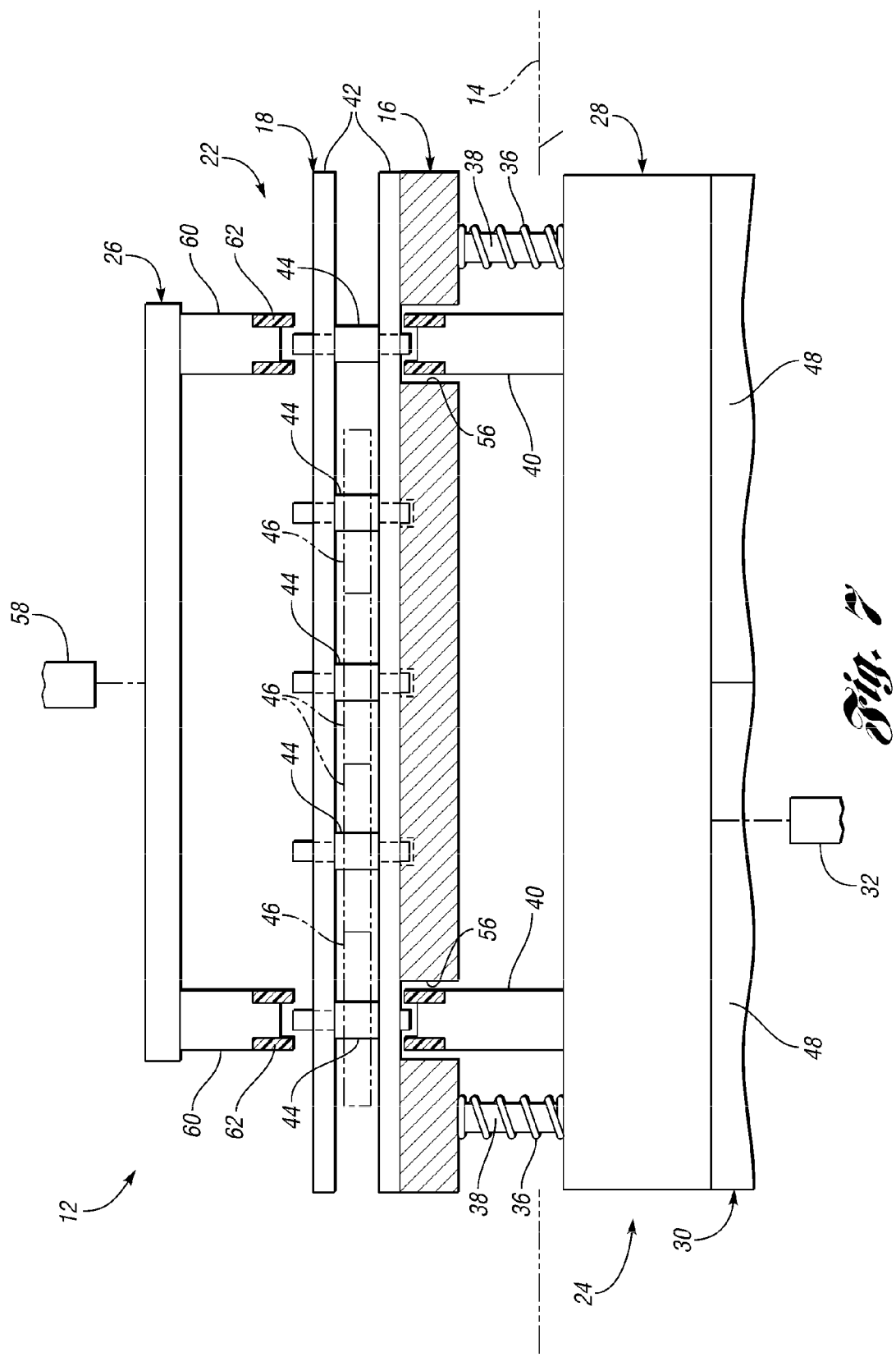
FIG. 7 is a schematic view illustrating the lower lift and lock assembly and the upper press that perform the staking.

The lower lifter 28 is movable upwardly and downwardly by an actuator 32 such as a pneumatic cylinder between the lower position of FIG. 3 and the raised position of FIG. 4 to lift the pallet 16 upwardly from spaced side reaches 34 of conveyor 14. After the staking as is hereinafter more fully described, the actuator 32 lowers the lower lifter 28 back to the lowered position of FIG. 3 to redeposit the pallet 16 on the conveyor 14 for movement from the staking station in preparation for receiving another pallet to commence the next cycle. As best illustrated in FIG. 7, the lower lifter 28 includes at least one spring 36 and preferably includes a plurality of the springs for resiliently lifting the pallet 16 upwardly from the conveyor 14 under the impetus of the actuator 32 (FIGS. 3-5). Each spring 36 as shown in FIG. 7 is of the helical type and encircles a guide post 38 extending slightly upwardly therefrom to resiliently contact the lower side of the pallet 16 during the upward movement that provides the pallet lifting. The lower lifter 28 also includes at least one and preferably includes a plurality of staking punches 40 to provide the staking from below the pallet.

With continuing reference to FIG. 7, the part assembly 18 is disclosed as including lower and upper plates 42 that are spaced from each other and as also including fasteners 44 to be staked. As illustrated, two of the fasteners 44 are staked at the illustrated staking station and there are other fasteners which are staked at the other stations. These fasteners in addition to securing the plates 42 to each other provide for mounting of latching components collectively indicated by 46 in phantom line representation. As previously mentioned, the latching components are located between the spaced plates and can also be located on outer sides of the plates. When the components are on the lower side of the lower spaced plate 42, suitable recessing of the pallet receives the component(s) to permit proper positioning.

The lower lock 30 illustrated in FIGS. 3-5 and 7 includes at least one lower lock member 48 and as illustrated includes a pair of the lower lock members 48 which have an unlocked position where they are located on opposite sides of the lowered lower lifter 28 spaced from each other along the direction of conveyance C. Upward movement of the lower lifter 28 from the position of FIG. 3 to the position of FIG. 4 to lift the pallet 16 from the conveyor 14 raises the lower lifter slightly above the upper extremity of the lower lock members 48 which are then moved in horizontally opposite directions along the direction of conveyance C by associated actuators 50 toward each other to below the lower lifter 24 as shown in FIG. 5. The lower lifter actuator 32 then lowers the lower lifter 28 downwardly onto the lower lock members 48 which move horizontally along a horizontal rigid base 52 of the apparatus framework 54 as best shown in FIG. 2. The lower lock members 48 of the lower lock 30 as shown in FIGS. 5 and 7 provide rigid support to the upwardly moved lower lifter 28 for the staking operation which is hereinafter more fully described in connection with FIG. 7 which shows the lower staking punches 40 as being aligned with pallet openings 56 so as to have access to the associated fasteners 44 to be staked from the lower side of the part assembly 18.

Figure 6:
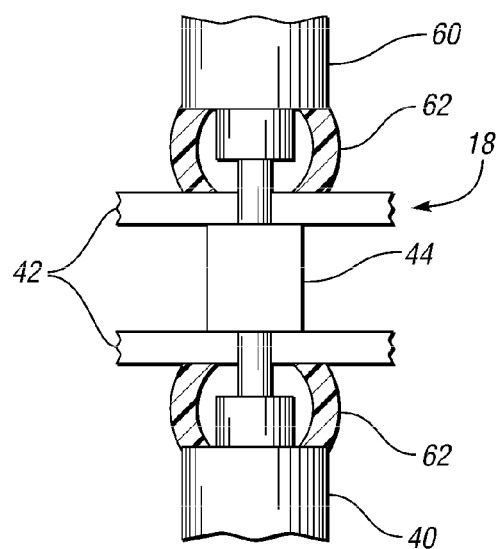
FIG. 6 is a partial view that illustrates the manner in which a fastener is staked between lower and upper staking punches which have resilient bushings that extend around the fastener being staked.

As shown in FIGS. 2-5 and 7, the upper press 26 includes an actuator 58 for providing vertical movement preferably by a hydraulic cylinder that moves the upper press downwardly for the staking operation and then moves it then back upwardly in preparation for the next cycle. The upper press includes a pair of upper staking punches 60 that are aligned with the lower staking punches 40 as shown in FIG. 7. Downward movement of the upper press 26 by the actuator 58 initially contacts the upper staking punches 60 with the aligned fasteners 44 from above and moves the part assembly 18 and pallet 16 downwardly against the resilient bias of the springs 36 supported by the lower lifter 28. The fasteners 44 then move downwardly and contact the lower staking punches 40 while both the part assembly and the pallet are resiliently supported which insures proper positioning of the fasteners 44 without any cocking during the staking More specifically as shown in FIG. 6, each of the lower and upper staking punches 40 and 60 includes a resilient bushing 62 that contacts the adjacent side of the part assembly 18 to provide proper positioning during the staking operation.

After the staking operation, the lower lock 30 is moved from the position of FIG. 7 to the position of FIG. 4 by the actuators 50 so the lower lifter 28 can be moved downwardly by its actuator 32 back to the position of FIG. 3 to redeposit the pallet 16 and the staked part assembly 18 on the conveyor 34 for movement from the staking station and movement of another pallet into the staking station for commencement of the next staking cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for staking a fastener of a part assembly, comprising:

conveying the part assembly and the fastener thereof on a pallet along a direction of conveyance to a staking station;

resiliently lifting the pallet and the part assembly thereon as well as the fastener of the part assembly upwardly from the conveyor to a location between lower and upper staking punches;

providing relative movement of the lower and upper staking punches toward each other to stake the fastener of the part assembly;

lowering the pallet and the staked part assembly downwardly onto the conveyor for conveyance from the staking station;

the lower and upper staking punches having resilient bushings that respectively contact the part assembly from below and above during the staking;

the lower staking punch being supported by a lower lifter for the staking and the upper staking punch being moved downwardly to provide the relative movement of the lower and upper staking punches toward each other to stake the fastener of the part assembly; and the lower staking punch being supported by a lower lifter that includes springs for providing the resilient lifting of the pallet upwardly from the conveyor upon upward movement of the lower lifter, and a lower lock moving at least one lock member from an unlocked position adjacent the lower lifter to a locked position below the lower lifter to support the lower lifter during the staking provided by the downward movement of the upper staking punch.

2. A method for staking a part assembly fastener as in claim 1 wherein a pair of lock members are moved in opposite directions to each other from an unlocked position on opposite sides of the lower lifter to a locked position below the lower lifter to support the lower lifter during the staking provided by the downward movement of the upper staking punch.

3. A method for staking a part assembly fastener as in claim 2 wherein the pair of lock members are moved along the direction of conveyance between the locked and unlocked positions.

4. A method for staking a part assembly fastener as in claim 3 wherein relative movement of a plurality of lower and upper punches toward each other respectively stake a plurality of fasteners of the part assembly.

5. A method for staking a plurality of fasteners of a part assembly, comprising:

conveying the part assembly and the fasteners on a pallet along a direction of conveyance to a staking station;

moving a lower lifter upwardly so springs thereof resiliently lift the pallet and the part assembly thereon as well as the fasteners of the part assembly upwardly from the conveyor to a location between lower staking punches of the lower lifter and upper staking punches of an upper press;

moving a pair of lock members of a lower lock along the direction of conveyance from an unlocked position on opposite sides of the lower lifter to a locked position below the upwardly moved lower lifter to provide support to the lower lifter;

moving the upper press and the upper staking punches thereof downwardly toward the lower lifter so the lower and upper staking punches stake the fasteners of the part assembly; and moving the pair of lock members back to the unlocked position and then moving the lower lifter downwardly to lower the pallet and the staked part assembly thereon downwardly onto the conveyor for conveyance from the staking station.

\* \* \* \* \*